United States Patent
Engle

(10) Patent No.: US 8,001,008 B2
(45) Date of Patent: Aug. 16, 2011

(54) SYSTEM AND METHOD OF COLLABORATIVE FILTERING BASED ON ATTRIBUTE PROFILING

(76) Inventor: Garett Engle, Mill Valley, CA (US)

( * ) Notice: Subject to any disclaimer, the term of this patent is extended or adjusted under 35 U.S.C. 154(b) by 1282 days.

(21) Appl. No.: 11/636,928

(22) Filed: Dec. 11, 2006

(65) Prior Publication Data

US 2008/0097867 A1    Apr. 24, 2008

Related U.S. Application Data

(60) Provisional application No. 60/854,140, filed on Oct. 24, 2006.

(51) Int. Cl.
*G06Q 30/00* (2006.01)
(52) U.S. Cl. .................. 705/26; 705/27; 705/37
(58) Field of Classification Search ............ 705/26, 705/37
See application file for complete search history.

(56) References Cited

U.S. PATENT DOCUMENTS

| | | | |
|---|---|---|---|
| 5,867,799 A | 2/1999 | Lang et al. | |
| 5,999,908 A | 12/1999 | Abelow | |
| 6,980,966 B1 | 12/2005 | Sobrado et al. | |
| 7,630,986 B1 * | 12/2009 | Herz et al. | 1/1 |
| 2002/0052873 A1 | 5/2002 | Delgado et al. | |
| 2002/0065797 A1 | 5/2002 | Meidan et al. | |
| 2002/0161664 A1 | 10/2002 | Shaya et al. | |
| 2004/0044565 A1 | 3/2004 | Kumar et al. | |
| 2004/0267816 A1 | 12/2004 | Russek | |
| 2005/0049987 A1 | 3/2005 | Meek et al. | |
| 2005/0076093 A1 | 4/2005 | Michelitsch et al. | |
| 2005/0132014 A1 | 6/2005 | Horvitz et al. | |
| 2006/0041548 A1 * | 2/2006 | Parsons et al. | 707/5 |
| 2006/0085750 A1 | 4/2006 | Easton, et al. | |

FOREIGN PATENT DOCUMENTS

| | | |
|---|---|---|
| WO | WO-0208953 A1 | 1/2002 |
| WO | WO-2004092881 A2 | 10/2004 |

OTHER PUBLICATIONS

Birn, Chapter 03: The best research techniques anyone can use Effective Use of Market Research: How to Drive and Focus Better Business Decisions. (4th ed.). London: 2004. p. 59, downloaded form ProQuestDirect on the Internet on May 8, 2011, 38 pages.*

* cited by examiner

*Primary Examiner* — James Zurita
(74) *Attorney, Agent, or Firm* — Carr & Ferrell LLP

(57) ABSTRACT

A system and/or a method of collaborative filtering based on attribute profiling is disclosed. In one embodiment, a method includes generating a product profile of a content-based product through applying any number of value data assigned by a user to a set of attributes embodying possible reasons as to why the user reacts to the content-based product, generating a user profile of a user through applying a group of value data assigned by the user to a content-based product sharing the set of attributes and recommending a different content-based product matches with the user profile beyond a threshold value. The method may include recommending the different content-based product to a different user when a different user profile of the different matches with the user profile of the user who has subscribed to the different content-based product.

16 Claims, 13 Drawing Sheets

| GENRES/ATTRIBUTES: | — 302 |
|---|---|
| ACTION/ADVENTURE | |
| ANIMATION/COMPUTER GRAPHICS | |
| ARTISTIC/SURREAL THEME(S) | |
| COMPETITION SPORTS | |
| DRAMA | |
| GORE | |
| HUMOR | |
| INNOCENCE/YOUTHFULNESS | |
| INSIGHTS/EDUCATION | |
| INTRIGUE/SUSPENSE | |
| MUSIC | |
| PHILOSOPHY/SPIRITUALITY | |
| POIGNANCY/FEELING | |
| ROMANCE/RELATIONSHIPS | |
| SCI-FI / FANTASY THEME(S) | |
| SHOWMANSHIP/PERFORMANCE | |
| STORY/PLOT | |
| VIOLENCE | |

SYSTEM AND METHOD OF COLLABORATIVE FILTERING BASED ON ATTRIBUTE PROFILING

PRIORITY CLAIM

This patent applications claims the priority from a U.S. provisional patent application No. 60/854,140 filed on Oct. 24, 2006.

FIELD OF TECHNOLOGY

This disclosure relates generally to the technical fields of software and/or hardware technology and, in one example embodiment, to a system and/or a method of collaborative filtering based on attribute profiling.

BACKGROUND

A collaborative filtering may refer to a technique that identifies information a user may be interested in. The collaborative filtering may first define preferences of a group of users who have used a product in order to set up a recommendation system (e.g., which may enhance a buying experience of the user through recommending the product when the user is likely to enjoy the product).

The collaborative filtering may be based on a rating of the user when the product is categorized according to a genre of the product (e.g., which may be relevant in cases of books, products, songs, etc.). The rating based on the genre of the product may tell a company (e.g., employing a genre-based rating system) about a taste of the user and/or help the company to highlight the product which the user most likely enjoy. However, there may not be enough information in the rating based on the genre, to achieve desired results of a successful product recommendation because a domain of the rating based on the genre may not reach a desired range of the successful product recommendation. The rating based on the genre may be too general where thousands of products may fit into a particular genre.

Alternatively, the company may allow the group of users to create tags about the product. However, there may be no structure to link the tags (e.g., which may be random) together. For instance, two users may like product for a similar reason, but information that the two users like the product for a particular reason may not be derived if the two users were to use different tags to describe the product. In sum, the collaborative filtering based on the genre and/or the tags may be too general and/or arbitrary to be effective in recommending the product. This may hinder the company from getting more business from the user who may be discouraged from buying more products from the company when the user finds the products recommended by the collaborative filtering may not be that relevant to interests and/or needs of the user.

SUMMARY

A system and/or a method of collaborative filtering based on attribute profiling is disclosed. In one aspect, a method includes generating a product profile (e.g., a product profile 116 of FIG. 1) of a content-based product through applying any number of value data (e.g., the value data to include 1 for liking the content-based product, 0 for no opinion, and/or −1 for disliking the content-based product) assigned by a user to a set of attributes embodying possible reasons as to why the user reacts to the content-based product, generating a user profile (e.g., a user profile 128 of FIG. 1) of a user through applying a group of value data assigned by the user to a content-based product sharing the set of attributes and/or recommending a different content-based product to the user when a different product profile of the different content-based product matches with the user profile (e.g., the user profile 128 of FIG. 1) beyond a threshold value.

In addition, the method may include recommending the different content-based product to a different user when a different user profile of the different user matches with the user profile (e.g., the user profile 128 of FIG. 1) of the user who has subscribed to the different content-based product. The method may also include recommending a particular content-based product to the user who has subscribed to the different content-based product when a particular product profile (e.g., a product profile 130 of FIG. 1) of the particular content-based product matches with the different product profile of the different content-based product.

The method may further include simultaneously rendering to the user a possible genre of the content-based product and/or a set of attributes with each set of attributes corresponding to each genre (e.g., the each genre may be determined by a distinctive style, a form, and/or a content of the content-based product) of the possible genre of the content-based product. Also, the method may include applying a bio data (e.g., a bio data 132A-N of FIG. 1) of the user to perform the recommending of the different content-based product so as to increase accuracy of the recommendation. Furthermore, the method may include determining the set of attributes that may be displayed to the user based on any number of tag data assigned by a group of opinion leaders evaluating the content-based product prior to the display.

The method may include generating a discrete user profile associated with each genre of the content-based product. Moreover, the method may include searching for a set of text data reviewing the content-based product through any number of selected websites to collect any number of meta-data describing the content-based product and/or evaluating any number of meta-data to determine a genre of the content based product.

The method may further include selecting a collection of attributes from any number of meta-data based on an algorithm which may consider a frequency of occurrence and/or semantics of each of the any number of meta-data. In addition, the method may include rendering to the user the collection of attributes associated with the genre of the content-based product when the user selects the genre.

In another aspect, a method includes generating any number of user profiles of users of a network through accumulating a set of value data assigned by the users to a set of attributes (e.g., the set of attributes may embody possible reasons as to why the users react to any number of content-based products) uniformly identifying any number of content-based products and/or automatically connecting a first user of the network (e.g., the network 108 of FIG. 1) and/or a second user of the network (e.g., the network 108 of FIG. 1) when a first user profile of the first user matches with a second user profile of the second user beyond a threshold value.

Furthermore, the method may include rendering a first bio data of the first user to the second user and/or a second bio data of the second user to the first user. The method may also include communicating an invitation data to an unregistered user acquainted by a registered user.

In yet another aspect, a system includes a content provide module to collect any number of value data assigned by any number of users to a set of attributes embodying possible reasons as to why a number of users react to a content-based product and a recommendation module (e.g., a recommendation module 102 of FIG. 1) to recommend the content-based product to a particular user when a product profile (e.g., a product profile 130 of FIG. 1) of the content-based product matches with a user profile (e.g., a user profile 128 of FIG. 1) of the particular user beyond a threshold value.

Furthermore, the method may include an attribute profile module (e.g., an attribute profile module 120 of FIG. 1) of the recommendation module (e.g., the recommendation module 102 of FIG. 1) to generate the user profile (e.g., the user profile 128 of FIG. 1) and/or the product profile (e.g., the product profile 130 of FIG. 1). The method may also include an attribute select module (e.g., an attribute select module 120 of FIG. 1) of the recommendation module (e.g. the recommendation module 102 of FIG. 1) to fetch and/or display the set of attributes corresponding to the content-based product. In addition, the method may also include a match module (e.g., a match module 118 of FIG. 1) of the recommendation module (e.g., the recommendation module 102 of FIG. 1) to connect the particular user to the content-based product when the user profile of the particular user matches with the product profile of the content based product beyond a threshold value.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A system and/or a method of collaborative filtering based on attribute profiling is disclosed. In the following description, for purposes of explanation, numerous specific details are set forth in order to provide a thorough understanding of the various embodiments. It will be evident however, to one skilled in the art that the various embodiments may be practiced without these specific details.

In one embodiment, a method includes generating a product profile (e.g., a product profile 130 of FIG. 1) of a content-based product through applying a value data assigned by a user to a set of attributes embodying possible reasons as to why the user reacts to the content-based product, generating a user profile (e.g., a user profile 128 of FIG. 1) of the user through applying a group of value data assigned by the user to content-based product sharing the set of attributes and/or recommending a different content-based product to the user when a different product profile of the different content-based product matches with the user profile beyond a threshold value.

In another embodiment, a method includes generating any number of user profiles of users of a network (e.g., a network 108 of FIG. 1) through accumulating a set of value data assigned by the users to a set of attributes uniformly identifying any number of content-based products and/or automatically connecting a first user of the network and/or a second user of the network (e.g., the network 108 of FIG. 1) when a first user profile of the first user matches with a second user profile of the second user beyond a threshold value.

In yet another embodiment, a system includes a content provider module to collect a number of value data assigned by any number of users to a set of attributes embodying possible reasons as to why the users react to a content-based product and/or a recommendation module (e.g., a recommendation module 102 of FIG. 1) to recommend the content-based product to a particular user when a product profile (e.g., a product profile 130 of FIG. 1) of the content-based product matches with a user profile (e.g., a user profile 128 of FIG. 1) of the particular user beyond a threshold value.

Figure 1:
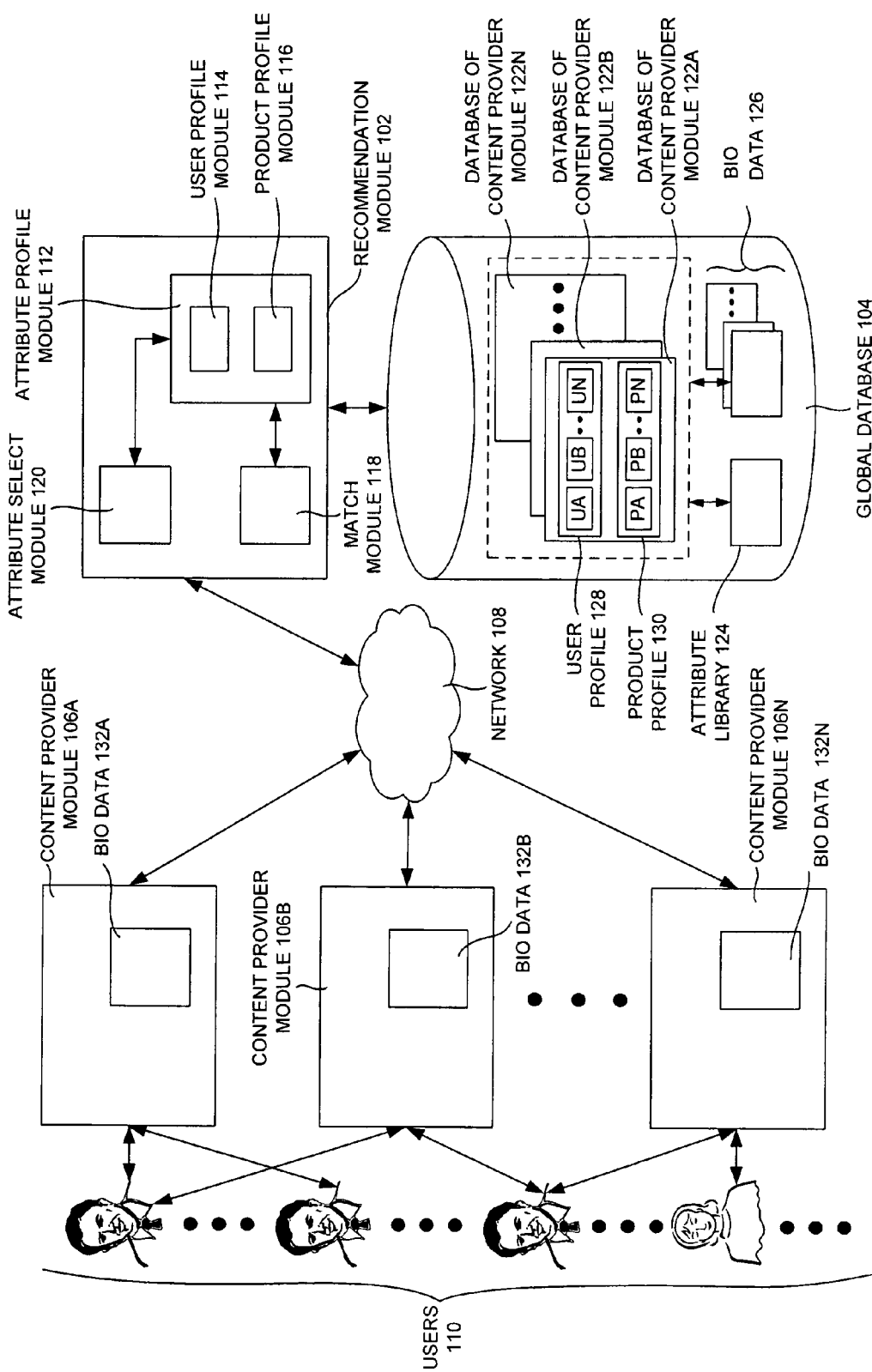
FIG. 1 is a system view of a recommendation module communicating with a global database and a content provider module(s) and users through a network, according to one embodiment.

FIG. 1 is a system view of a recommendation module 102 communicating with a global database 104 and a content provider module(s) 106 and users 110, through a network 108, according to one embodiment. Particularly, the recommendation module 102 may include an attribute profile module 112, a user profile module 114, a product profile module 116, a match module 118 and an attribute select module 120, according to one embodiment. The global database 104 may include a database of content provider module 122, an attribute library 124, a bio data 126, a user profile 128, and a product profile 130. The content provider module 106 may include a bio data 132 in one embodiment.

The recommendation module 102 may recommend different content-based product to a user based on a user profile (e.g., a user profile 128 of FIG. 1) of the user and a product profile (e.g., a product profile 130 of FIG. 1) of a content-based product. The global database 104 may store and/or manage a collection of user profile(s) 128 and product profile (s) 130. The content provider module 106 may make their content (e.g., bibliographic resources, full-text, data-sets, images, videos, learning objects, etc.) available to the user(s) for preview. The network 108 may be any collection of networks (e.g., internet, private networks, university social system, private network of a company etc) that may transfer any data (e.g., product profile, user profile data, etc) to the user. The users 110 may be a consumer, customer and/or client subscribing a product and/or a service and/or participate in rating of the product based on predefined attributes of the product.

The attribute profile module 112 may build the user profile (e.g., the user profile 128 of FIG. 1) and the product profile (e.g., the product profile 130 of FIG. 1) based on contribution of the user using a set of attributes predefined for a particular product. The match module 118 may match a product that has not been used (e.g., seen, bought, heard, etc.) by the user by matching a product profile of the product and a user profile of the user. The attribute select module 120 may opt for a suitable set of attributes for a particular product and/or a service subscribed by the user. The database of content provider module(s) 122 may create, store and/or supply the data of the user profile (e.g., attribute profile of the user) and/or the product profile (e.g., attribute profile of the product) in a global database.

The attribute library 124 may generate and/or contain sets of attributes that may be referred to in rating a product by a user. The user profile 128 may be an attribute profile of the user created when the user rates a particular product. The user profile 128 may be updated (e.g., through accumulation of value data of FIG. 2) as the user rates more products sharing a same set of attributes. The product profile 130 may be an attribute profile of the product based on user ratings of the product and/or may be updated as more users rate the product. The bio data 132 may contain facts or events in a person's life, such as a name, a date of birth, a gender, hobbies, and/or interests.

The recommendation module 102 may communicate with global database 104 and the content provider module(s) 106 through the network 108. The content provider module 106 that may communicate with the users 110. For example, an attribute select module (e.g., the attribute select module 120) of a recommendation module (e.g., the recommendation module 102) may fetch and/or display a set of attributes (e.g., from the attribute profile 124) corresponding to a content-based product. The set of attributes may embody possible reasons as to why the users react to the content-based products. A content provide module (e.g., the content provider module 106) may collect any number of value data assigned by any number of users (e.g., the users 110) to the set of attributes embodying possible reasons as to why the users may react to the content-based product.

An attribute profile module (e.g., the attribute profile module 112) of a recommendation module (e.g., the recommendation module 102) may generate a user profile (e.g., the user profile 128) and/or a product profile (e.g., the product profile 130). A match module (e.g., the match module 118) of the recommendation module may connect a particular user to the content-based product when a user profile of the particular user matches with a product profile of the content based product beyond a threshold value (e.g., which may be set by an administrator of the recommendation module 102 and/or the content provider module 106).

Also, the recommendation module may recommend the content-based product to the particular user when the product profile of the content-based product matches with the user profile of the particular user beyond a threshold value. A bio data (e.g., the bio data 132) of the users (e.g., the users 110) may be applied to perform recommendation of the different content-based product so as to increase an accuracy of the recommendation.

Figure 2:
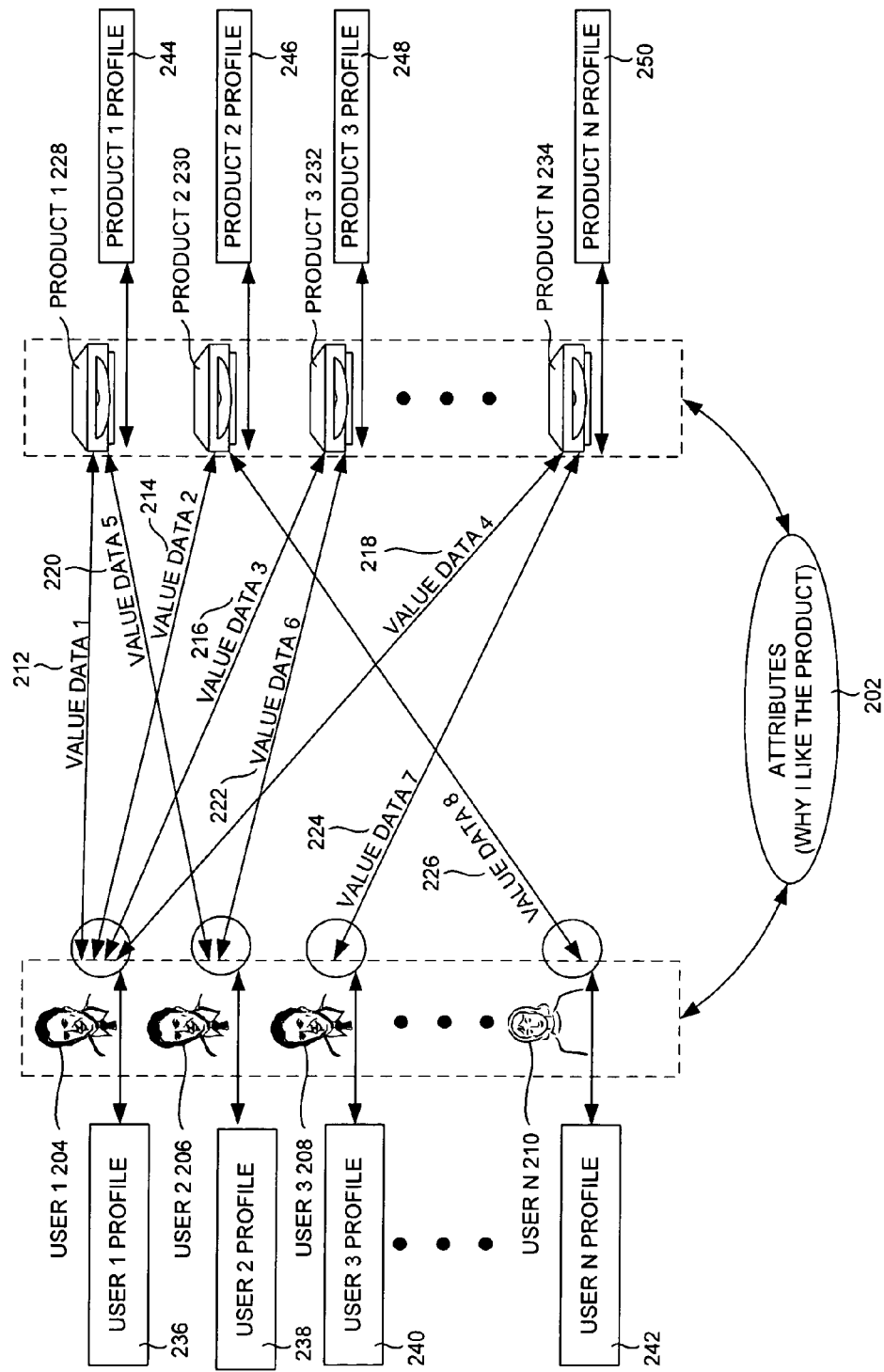
FIG. 2 is an interaction diagram of users and products to form user profiles and product profiles, according to one embodiment.

FIG. 2 is an interaction diagram of users and products to form user profiles and product profiles, according to one embodiment. Particularly, FIG. 2 may illustrate attributes 202, a user 1 204, a user 2 206, a user 3 208, a user N 210, a value data 1 212, a value data 2 214, a value data 3 216, a value data 4 218, a value data 5 220, a value data 6 222, a value data 7 224, a value data 8 226, a product 1 228, a product 2 230, a product 3 232, a product N 234, a user 1 profile 236, a user 2 profile 238, a user 3 profile 240, a user N profile 242, a product profile 1 244, a product profile 2 246, a product profile 3 248 and a product profile N 250.

The user may be a person rating any number of products on his/her likes and dislikes of the products. The user 2 206 may be a person rating any number of products on his/her likes and dislikes of the products. The user 3 208 may be a person rating any number of products on his/her likes and dislikes of the products. The user N 210 may be a person rating any number of products on his/her likes and dislikes of the products.

The value data 1 212 may be an opinion of the user 1 204 about the product 1 228. The value data 2 214 may be the opinion of the user 1 204 about the product 2 230. The value data 3 216 may be the opinion of the user 1 204 about the product 3 232. The value data 4 218 may be the opinion of the user 1 204 about the product N 250. The value data 5 218 may be the opinion of the user 2 206 about the product 1 228. The value data 6 222 may be the opinion of the user 2 206 about the product 3 232. The value data 7 224 may be the opinion of the user 3 208 about the product N 234. The value data 8 226 may be the opinion of the user N 210 about the product 2 230.

The product 1 228 may be any content-based product (e.g., a book, a song, etc.) and/or service that may be rated by a user. The product 2 230 may be any content-based product and/or service that may be rated by the user. The product 3 232 may be any content-based product and/or services that may be rated by the user. The product N 234 may be any content-based product and/or service that may be rated by the user.

The user 1 profile 236 may accumulate a preference of the user 1 204 every time the user 1 204 rates a product. The user 2 profile 238 may accumulate preference of the user 2 206 every time the user 2 206 rates a product. The user 3 profile 240 may accumulate preference of the user 3 208 every time the user 3 208 rates the product. The user N profile 242 may accumulate preference of the user N 210 every time the user N 210 rates the product.

The product profile 1 244 may accumulate ratings of the product 1 228 based on the users' likes and/or dislikes. The product profile 2 246 may accumulate ratings of the product 2 230 based on the users' likes and/or dislikes. The product profile 3 248 may accumulate ratings of the product 3 232 based on the users' likes and/or dislikes The product profile N 250 may accumulate ratings of the product N 234 based on the users' likes and/or dislikes.

The user may rate any number of products according to his/her opinion of the products. For example, a product profile (e.g., the product profile 130 of FIG. 1) of a content-based product may be generated through applying any number of value data (e.g., the value data to include 1 for liking the content-based product, 0 for no opinion, and −1 for disliking the content-based product) assigned by a user to a set of attributes embodying possible reasons as to why the user may react to the content-based product. In addition, a user profile (e.g., the user profile 128 of FIG. 1) of a user may be generated through applying a group of value data assigned by the user to a content-based product sharing the set of attributes.

Figures 3A, 3B:
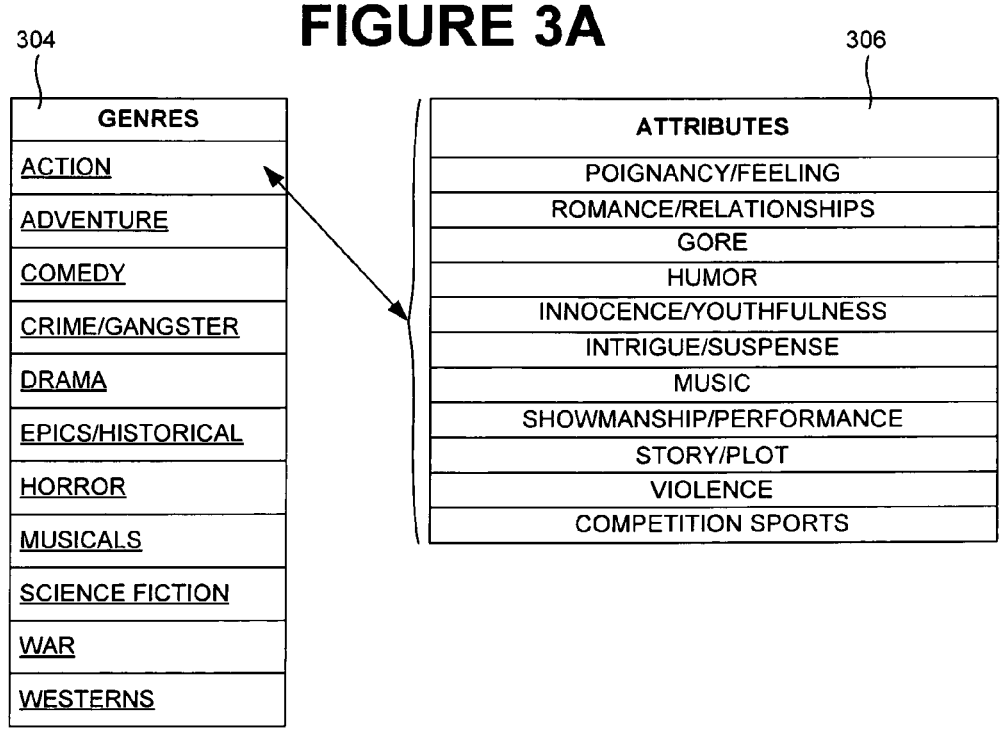
FIG. 3A is a catalog view of a genre and attributes, according to one embodiment.
FIG. 3B is a catalog view of genres and attributes, according to one embodiment.

FIG. 3A is a catalog view of genres/attributes 302, according to one embodiment. Particularly, FIG. 3A illustrates different types of genres and/or attributes such as action/adventure, animation/computer graphics, artistic/surreal theme(s), competition/sports, drama, gore, humor, innocence/youthfulness, insights/education, intrigue/suspense, music, philosophy/spirituality, poignancy/feeling, romance/relationships, sci-fi/fantasy theme(s), showmanship/performance, story/plot, and/or violence.

A user may be allowed to check off any attributes that may apply to a product. The genres such as the action/adventure and/or the drama of FIG. 3A may apply to "what" of the product. The attributes of FIG. 3A such as the artistic/surreal theme(s), the humor, and others may apply to "why" the user likes and/or dislikes the product. For example, a user may be simultaneously rendered to a possible genre of a content-based product and/or a set of attributes with each set of attributes corresponding to each genre of the possible genre of the content-based product. In addition, the set of attributes to display to the user may be determined based on a tag data assigned by a group of opinion leaders evaluating the content-based product prior to the display.

Furthermore, a set of text data reviewing the content-based product may be searched through a number of selected websites to collect any number of meta-data describing the content-based product. Also, the meta-data may be evaluated to determine a genre of the content based product. Moreover, a collection of attributes from the meta-data may be selected based on an algorithm which considers a frequency of occurrence and/or semantics of each of the meta-data.

FIG. 3B is a catalog view of genres 304 and attributes 306, according to one embodiment. The genres 304 may describe "what" of a product. Each of the genres 304 may include a set of the attributes 306 which tell "why" a user may like and/or dislike the product. For example, the genres 304 may include action, adventure, comedy, crime/gangster, drama, epics/historical, horror, musicals, science fiction, war, and/or westerns, as illustrated in an example embodiment of FIG. 3B.

In the example embodiment illustrated in FIG. 3B, an "action," which may be one of the genres 304, may display the attributes 306 such as poignancy/feeling, romance/relationships, gore, humor, innocence/youthfulness, intrigue/suspense, music, showmanship/performance, story/plot, violence, and/or competition sports. Similarly, each of other genres may display a different set of attributes that may be relevant to the each of other genres.

Furthermore, a discrete user profile associated with each genre (e.g., each genre may be determined by a distinctive style, a form, and a content of the content-based product) of a content-based product may be generated. In addition, a collection of attributes (e.g., the attributes 306) associated with a genre of the content-based product may be rendered to a user when the user selects a genre (e.g., from the genres 304).

Figure 4:
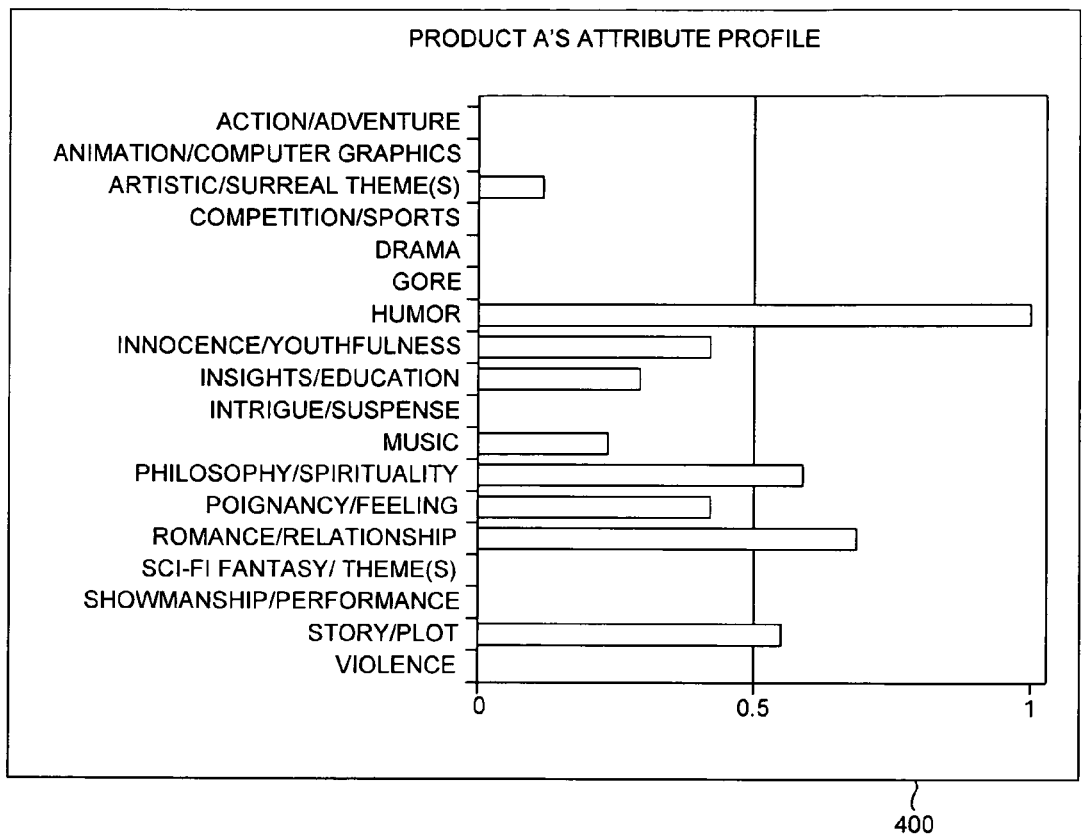
FIG. 4 is a product A's attribute profile, according to one embodiment.

FIG. 4 is a product A's attribute profile 400, according to one embodiment. The product A's attribute profile 400 may be associated with a complete and/or a unique description of a product and/or may just act like a fingerprint. Particularly, the product A's attribute profile 400 may also describe users' preference of attributes of the product A like action/adventure, animation/computer graphics, artistic/surreal theme(s), competition/sports, drama, gore, humor, innocence/youthfulness, insights/education, intrigue/suspense, music, philosophy/spirituality, poignancy/feeling, romance/relationship, sci-fi/fantasy theme(s), showmanship/performance, story/plot, violence etc.

An attribute profile of a user who subscribes to a type of product which encompasses product A may share attributes which may be identical to the attributes of product A. In FIG. 4, a user may check a "likes" column of the "humor" of Genres/Attributes 302 of FIG. 3A to indicate that the user likes the product because of its humor. In another case, the user may check a "dislikes" column of the "gore" of genres/attributes 302 of FIG. 3A to indicate that the user dislikes the product because of its gory nature. A system (e.g., the product profile module 116 of FIG. 1) may keep a running record of all value data the user submits. The product A's attribute profile may be a scaled down (e.g., to 1) version of the running records.

Accordingly, the product A's attribute profile 400 may be generated such that users may submit value data which represent the users' preferences for product A. As the value data are accumulated, an accuracy of product recommendation may be also enhanced. As the users' experience increase via the product A's attribute profile 400, the users may be incited to submit for more value data. There may be numerous types of comparisons possible, if attributes are defined and/or value data are collected. The attributes themselves may be completely open to be defined. Also, the value data may be defined different ways (e.g., likes/dislike, 1/−1, etc.).

Figure 5A:
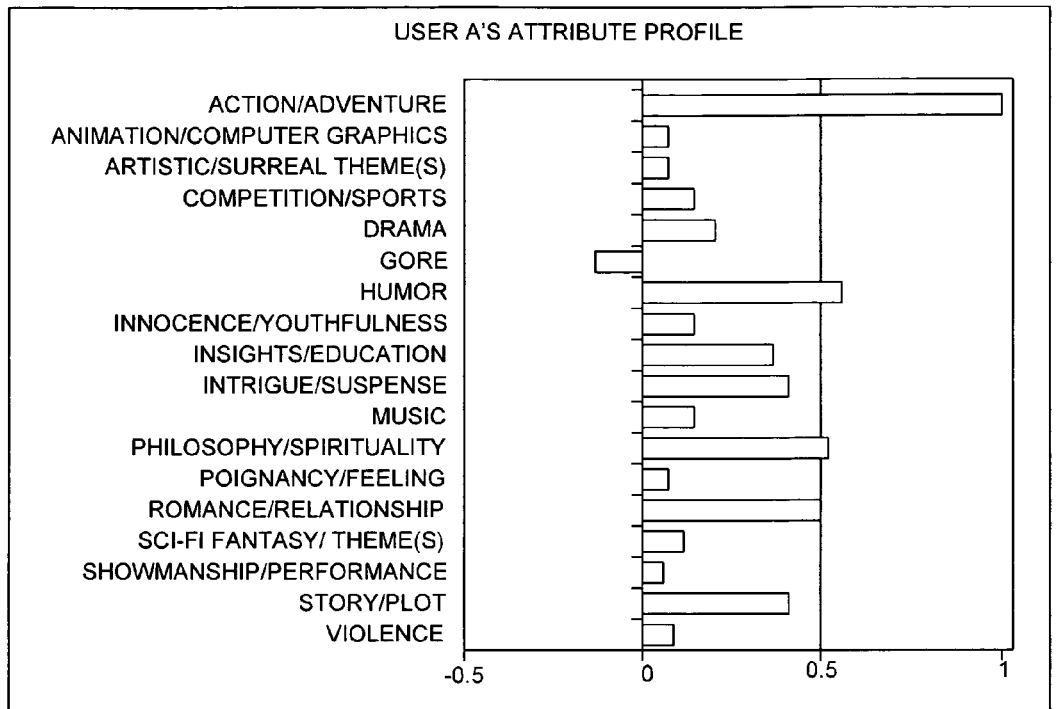
FIG. 5A is a user A's attribute profile, according to one embodiment.

FIG. 5A is a user A's attribute profile 500A, according to one embodiment. Particularly, the user A's attribute profile may be described in terms of various attributes such as action/adventure, animation/computer graphics, artistic/surreal theme(s), competition/sports, drama, gore, humor, innocence/youthfulness, insights/education, intrigue/suspense, music, philosophy/spirituality, poignancy/feeling, romance/relationships, sci-fi/fantasy theme(s), showmanship/performance, story/plot and/or violence.

A user may apply an attribute to a product, and the user profile module 114 of FIG. 1 may apply (e.g., add and/or subtract) an assigned value (e.g., whether positive and/or negative) to a user profile of the user. FIG. 5A illustrates a graphical representation of the user A's attribute profile 500A where the user may rate the product according to the user's likes and/or dislikes. The user may assign a positive and/or a negative value depending upon something that the user may really enjoy and/or abhor. The user may assign a value data to any of the attributes. The user profile module 114 may first gather the user's value data and/or generate (e.g., and/or update) an attribute profile of the user (e.g., the user profile 128 of FIG. 1) based upon dynamic, aggregate user feedbacks.

Figure 5B:
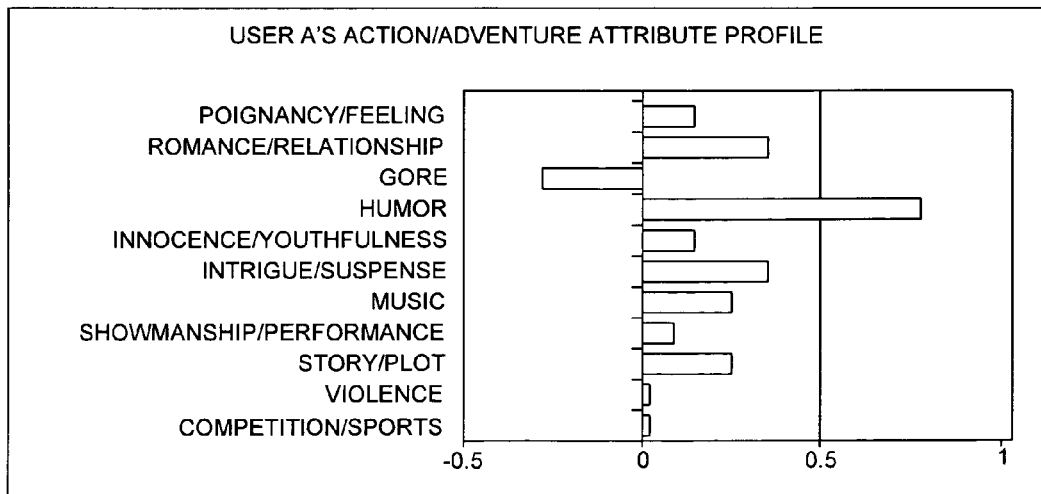
FIG. 5B is a user A's action/adventure attribute profile, according to one embodiment.

FIG. 5B is a user A's action/adventure attribute profile 500B, according to one embodiment. Particularly, it may also include attributes like poignancy/feeling, romance/relationships, gore, humor, innocence/youthfulness, intrigue/suspense, music, showmanship/performance, story/plot, violence, and/or competition sports. FIG. 5B illustrates the user A's attribute profile pertaining to one of the genres, namely "action."

A user profile of a user pertaining to a particular genre (e.g., the user A's action/adventure attribute profile) may be generated the same way as a user profile of the user, except that attributes of the user profile of the user pertaining to the particular genre may be comprised only of those attributes relevant to the particular genre. The user profile of the user pertaining to the particular genre may be more accurate in recommending a product to the user because information contained in the user profile of the user pertaining to the particular genre may describe preferences of the user more in-depth than the user profile of the user (e.g., which may encompasses all the genres). In this example, the user A's action/adventure attribute profile may capture a structured "fingerprint" of user A's preferences of a certain category of products (e.g., a content-based product) such that the match module 118 of FIG. 1 may be enabled to perfume more accurate product recommendations to user A.

Figure 6:
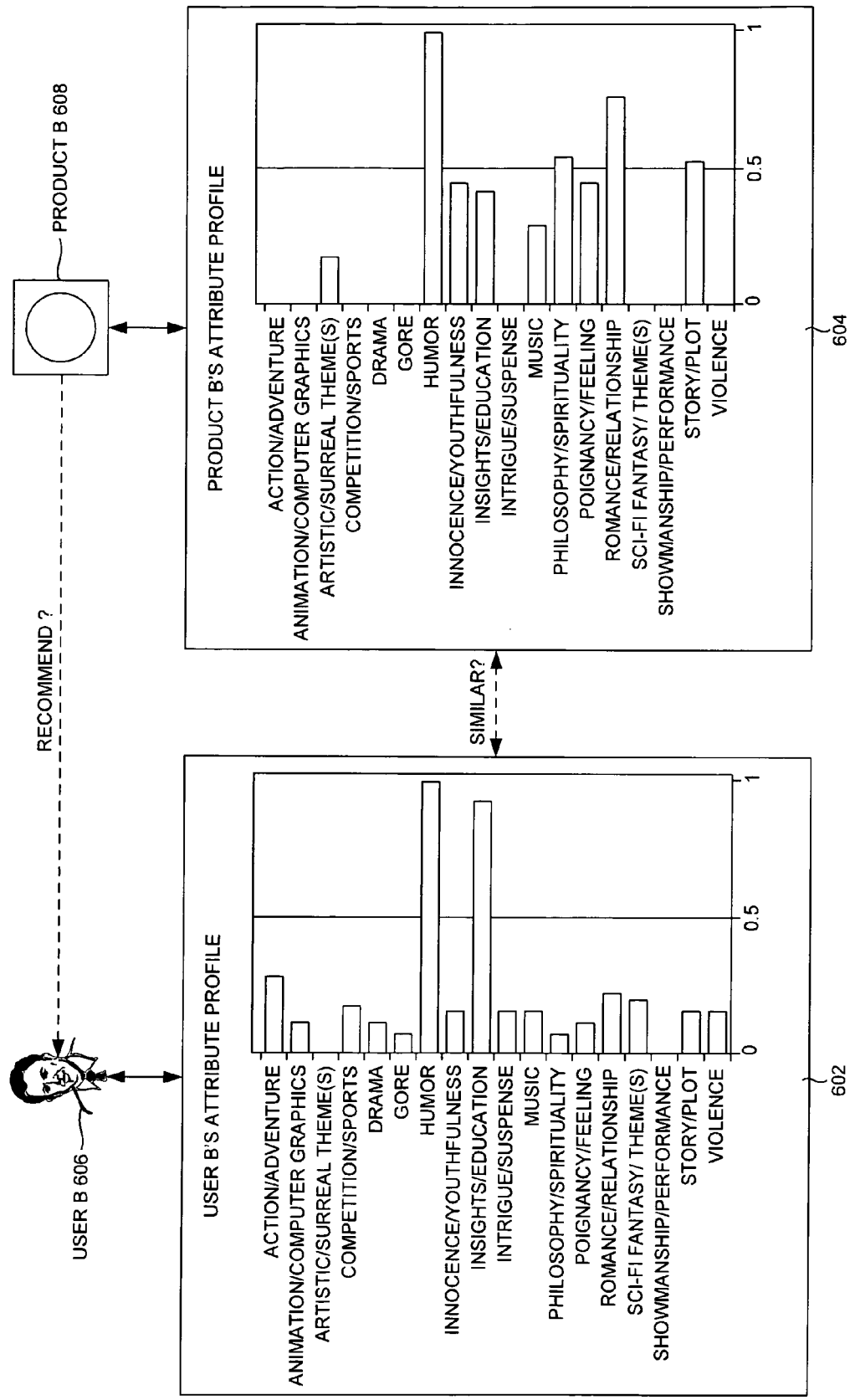
FIG. 6 is an exemplary view of recommending a content-based product to a user through comparing a product profile of the content-based product and a user profile of the user, according to one embodiment.

FIG. 6 is an exemplary view of recommending a content-based product to a user through comparing a product profile of the content-based product and a user profile of the user, according to one embodiment. Particularly, it may include a user B's attribute profile 602, a product B's attribute profile 604, a user B 606, and a product B 608. The user B's attribute profile 602 may describe what the user B 606 like/dislike across all the genres. In FIG. 6, the user B's attribute profile 602 may indicate that the user B 606 likes humor (e.g., comedies).

To determine whether the user B 606 likes or dislikes the product B 608, the match module 118 of FIG. 1 may have to compare the user B's attribute profile 602 with the product B's attribute profile 604. The recommendation module 102 may recommend product B to the user B 606 when the product B's attribute profile 604 (e.g., a product profile of the product B 608) matches with the user B's attribute profile 602 (e.g., a user profile of the user B 606) beyond a threshold value.

In FIG. 6, the user B's attribute profile 602 and the product B's attribute profile 604 may share a same, prominent attribute (e.g., humor) and/or there may not be anything in the product B 608 that may offend the user B 608. Accordingly, the product B 608 may be recommended to the user B 606. Furthermore, a different content-based product may be recommended to a user when a different product profile of the different content-based product may match with a user profile (e.g., the user profile 128 of FIG. 1) of the user beyond a threshold value.

Figure 7:
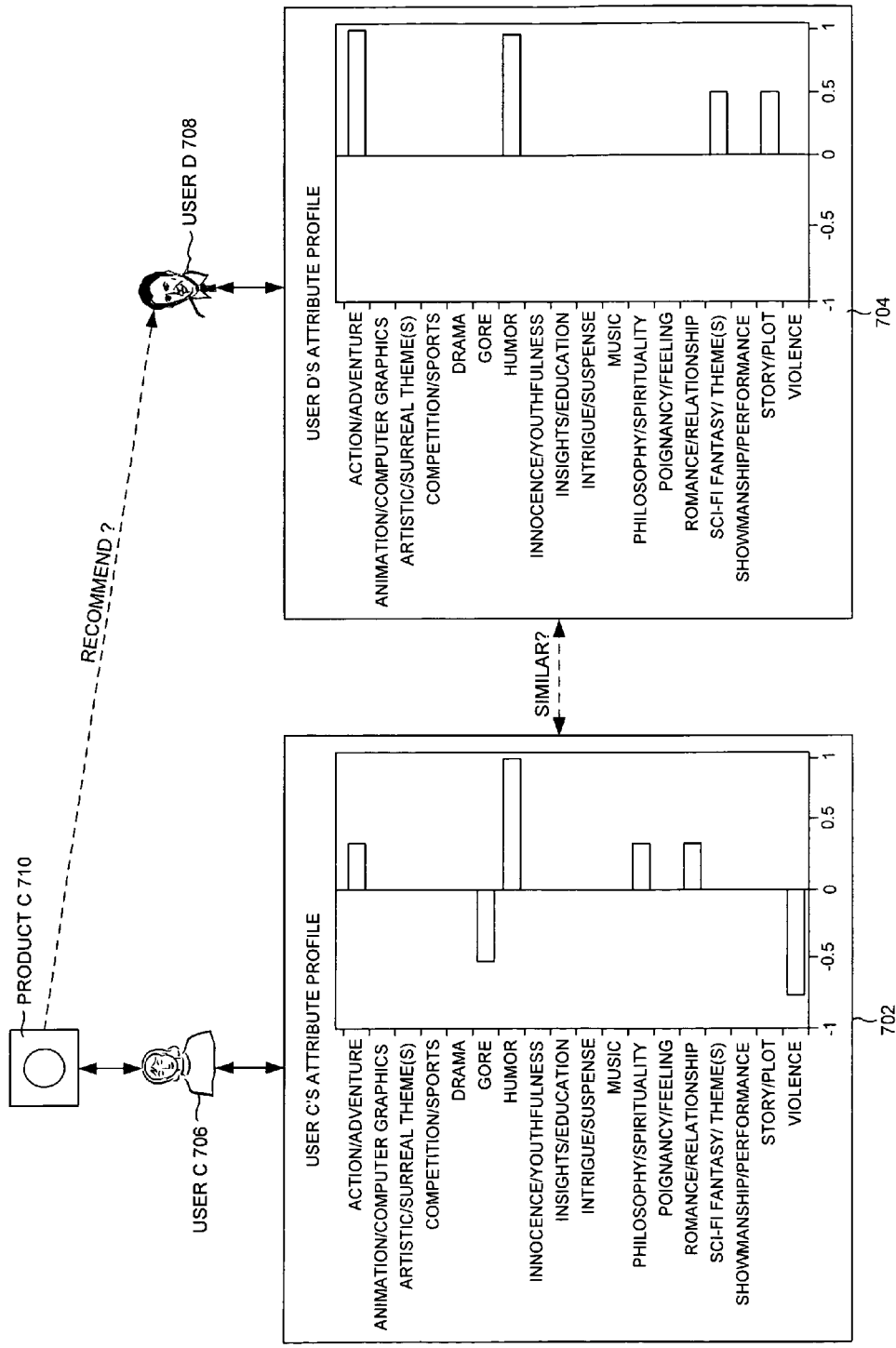
FIG. 7 is an exemplary view of recommending a content-based product already used by a user to a different user through comparing a user profile of the user and a different user profile of the different user, according to one embodiment.

FIG. 7 is an exemplary view of recommending a content-based product already used by a user to a different user through comparing a user profile of the user and a different user profile of the different user, according to one embodiment. Particularly, FIG. 7 illustrates a user C's attribute profile 702, a user D's attribute profile 704, a user C 706, user D 708, and a product C 710. In the example embodiment illustrated in FIG. 7, the user C's attribute profile 702 and the user D's attribute profile 704 may include attributes such as action/adventure, animation/computer graphics, artistic/surreal theme(s), competition/sports, drama, gore, humor, innocence/youthfulness, insights/education, intrigue/suspense, music, philosophy/spirituality, poignancy/feeling, romance/relationships, sci-fi/fantasy theme(s), showmanship/performance, story/plot and/or violence.

As an attribute profile of the user C 706 (e.g., the user C's attribute profile 702) matches with an attribute profile of the user D 708 (e.g., the user D's attribute profile 704), the product C 710 (e.g., which has already been watched by the user C 706) may be recommended to the user D 708 (e.g., who has yet to see the product C 710). Furthermore, a different content-based product may be recommended to a different user when a different user profile of the different user matches with a user profile of the user who has subscribed to the different content-based product.

Figure 8:
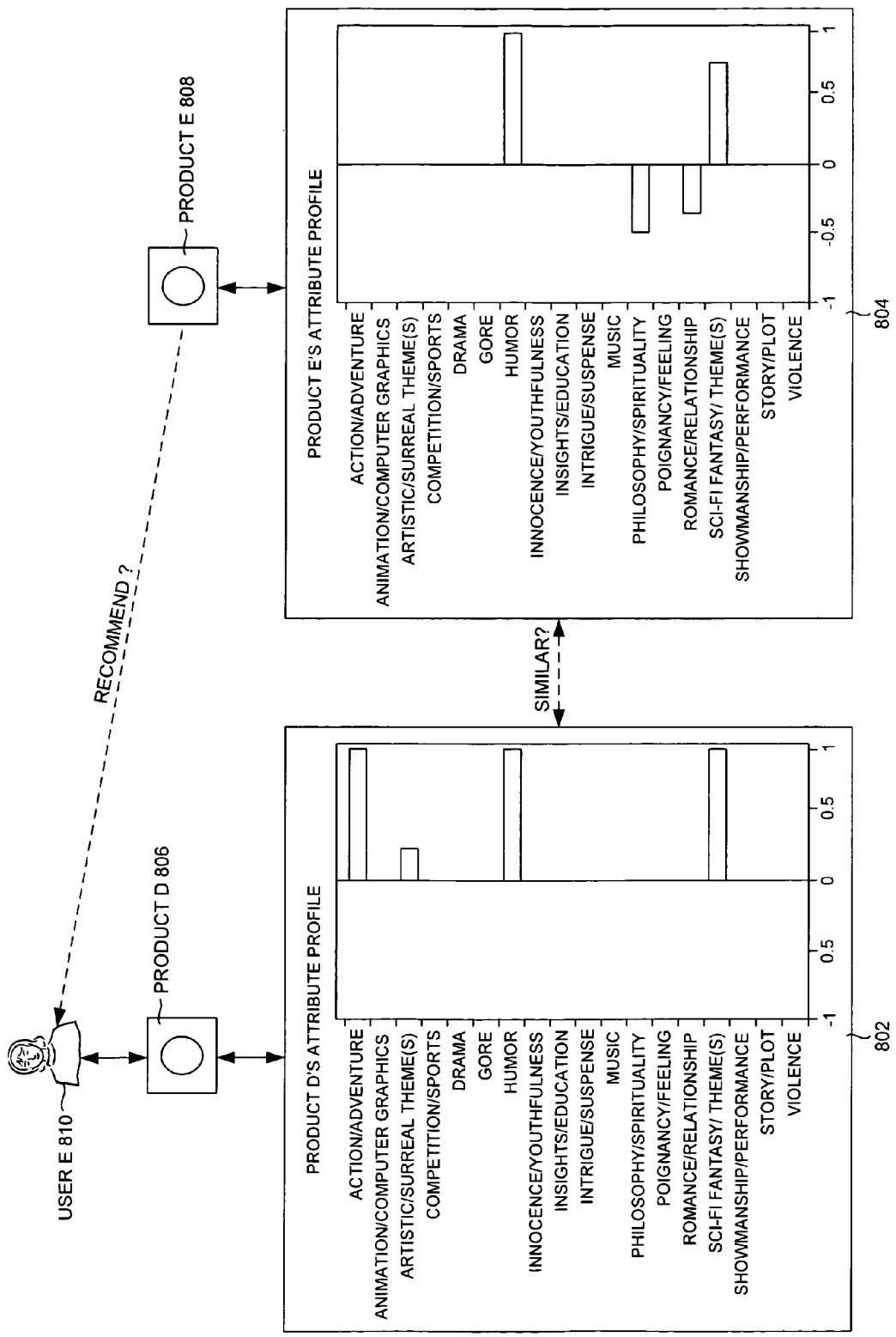
FIG. 8 is an exemplary view of recommending a different product to a user through comparing a product profile of a product and a different product profile of the different product, according to one embodiment.

FIG. 8 is an exemplary view of recommending a different product to a user through comparing a product profile of a product and a different product profile of the different product, according to one embodiment. Particularly, FIG. 8 illustrates a product D's attribute profile 802, a product E's attribute profile 804, a product D 806, a product E 808, and a user 810, according to one embodiment. In the example embodiment as illustrated in FIG. 8, the product D's attribute profile 802 and the product E's attribute profile may display attributes associated with the product D 806 and/or the product E 808 such as action/adventure, animation/computer graphics, artistic/surreal theme(s), competition/sports, drama, gore, humor, innocence/youthfulness, insights/education, intrigue/suspense, music, philosophy/spirituality, poignancy/feeling, romance/relationships, sci-fi/fantasy theme (s), showmanship/performance, story/plot and/or violence.

In one example embodiment, the product E 808 may be recommended to the user E 810 if the product D's attributes profile 802 (e.g., where the product D 806 has already been subscribed by the user E 810) matches with the product E's attribute profile 804 (e.g., where the product E 808 has not been subscribed by the user E 810 yet). A recommendation of the product E 808 may be realized when a similarity between the product D's attribute profile 802 and the product E's attribute profile 804 is greater than a threshold set by the match module 118 of FIG. 1.

For example, the threshold may be set such that two products being compared (e.g., the product D's attribute profile 802 and the product E's attribute profile 804) may be matched beyond the threshold value when the two products share at least two attributes with the highest score and the second highest score. Furthermore, a particular content-based product may be recommended to a user who has subscribed to a different content-based product when a particular product profile (e.g., a product profile 130 of FIG. 1) of the particular content-based product matches with a different product profile of the different content-based product.

Figure 9:
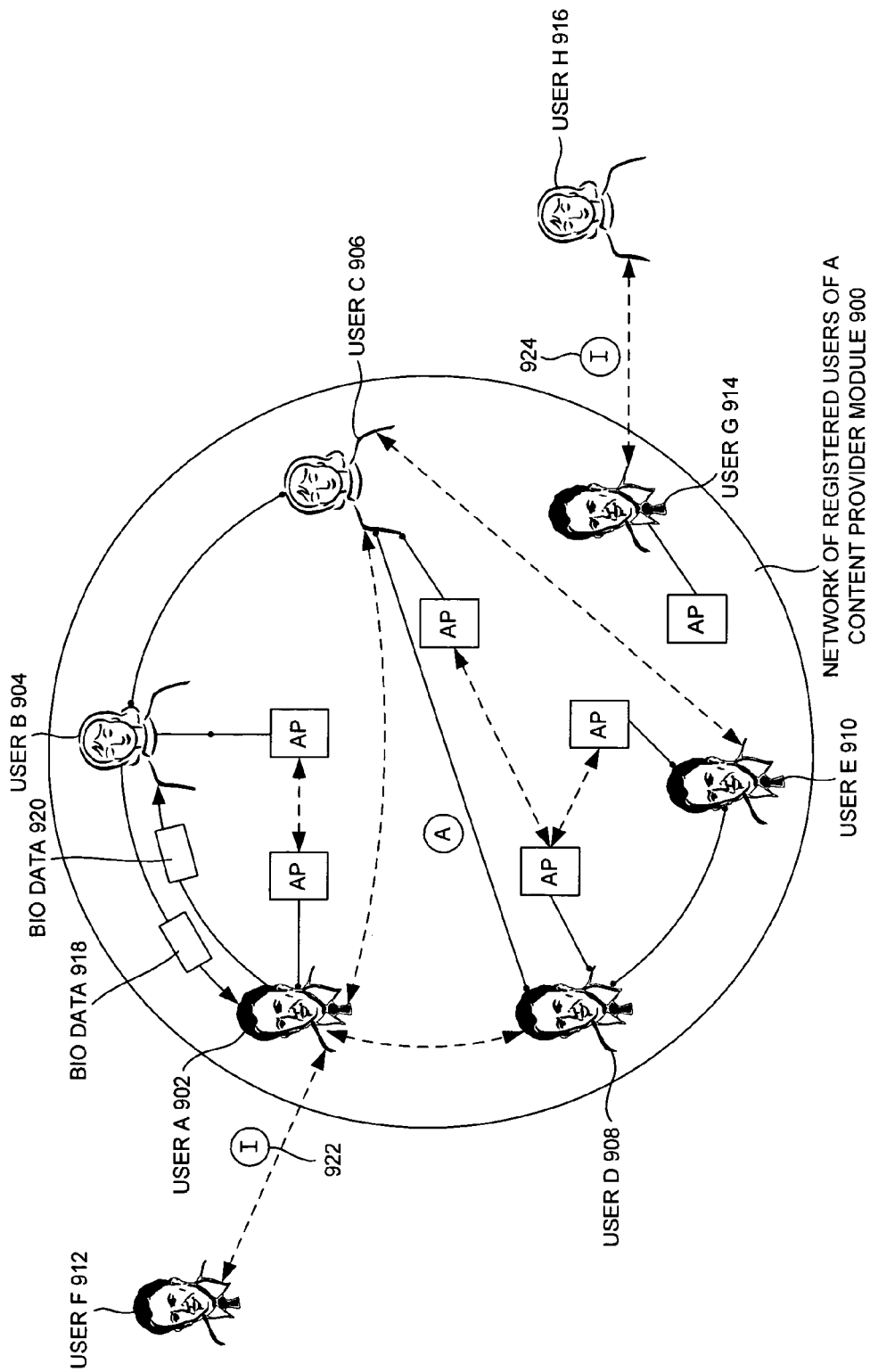
FIG. 9 is a network view of registered users of a content provider module, according to one embodiment.

FIG. 9 is a network view of registered users of the content provider module 106, according to one embodiment. Particularly, FIG. 9 illustrates a user A 902, a user B 904, a user C 906, a user D 908, a user E 910, a user F 912, a user G 914, a user H 916, a bio data 918, a bio data 920, an I 922, and/or an I 924. In one example embodiment, the match module 118 of FIG. 1 may compare a user profile (e.g., the user profile 128) of the user A 902 with a user profile (e.g., the user profile 128) of the user B 904. If the user profile of the user A 902 matches with the user profile of the user B 904, then the user A 902 may be automatically introduced to the user B 904.

In addition, the bio data 918 of the user B 904 may be forwarded to the user A 902 and/or the bio data 920 of the user A 902 may be forwarded to the user B 904. The user A and the user B may decide to connect (e.g., socially, professionally, etc.) based on their liking of their counterparts based on the bio data (e.g., the bio data 918 and/or the bio data 920).

The user B 904 may be already connected to the user C 906, as they may be mutual friends, old acquaintances, family members, etc. Because the user B 904 is a mutual friend to both the user A 902 and the user C 906, the user A 902 may be connected to the user C 906 (e.g., since the user A 902 and the user C 906 may learn about each other from the user B 904 whom they trust). Similarly, the user C 906 and the user E 910 who have the user D as a mutual friend may be connected. Also, the user A 902 and the user D 908 may be introduced (e.g., automatically) through the user C 906 once the user A 902 and the user D agree to be connected.

In addition, the user A 902 may invite user F 912 to the network of registered users of a content provider module 900.

Once the user F 912 accepts the invitation of the user A 902 and fills out a bio data of the user F 912, the user F 912 may be a registered member of the network of registered users of a content provider module 900. Similarly, the user G 914 may communicate an invitation to the user H 916 to sign up for the network of registered users of a content provider module 900.

Furthermore, a first user of a network (e.g., the registered users of a content provider module 900) and/or a second user of the network may be automatically connected when a first user profile of the first user matches with a second user profile of the second user beyond a threshold value. Furthermore, a first bio data (e.g., the bio data 920) of the first user (e.g., the user A 902) may be rendered to the second user (e.g., the user B 904) and/or a second bio data (e.g., the bio data 918) of the second user (e.g., the user B 904) may be rendered to the first user. In addition, an invitation data (e.g., the I 922 and/or the I 924) may be communicated to an unregistered user (e.g., the user F 912 and/or the user H 916) acquainted by a registered user (e.g., the user A 902 and/or the user G 914).

Figure 10:
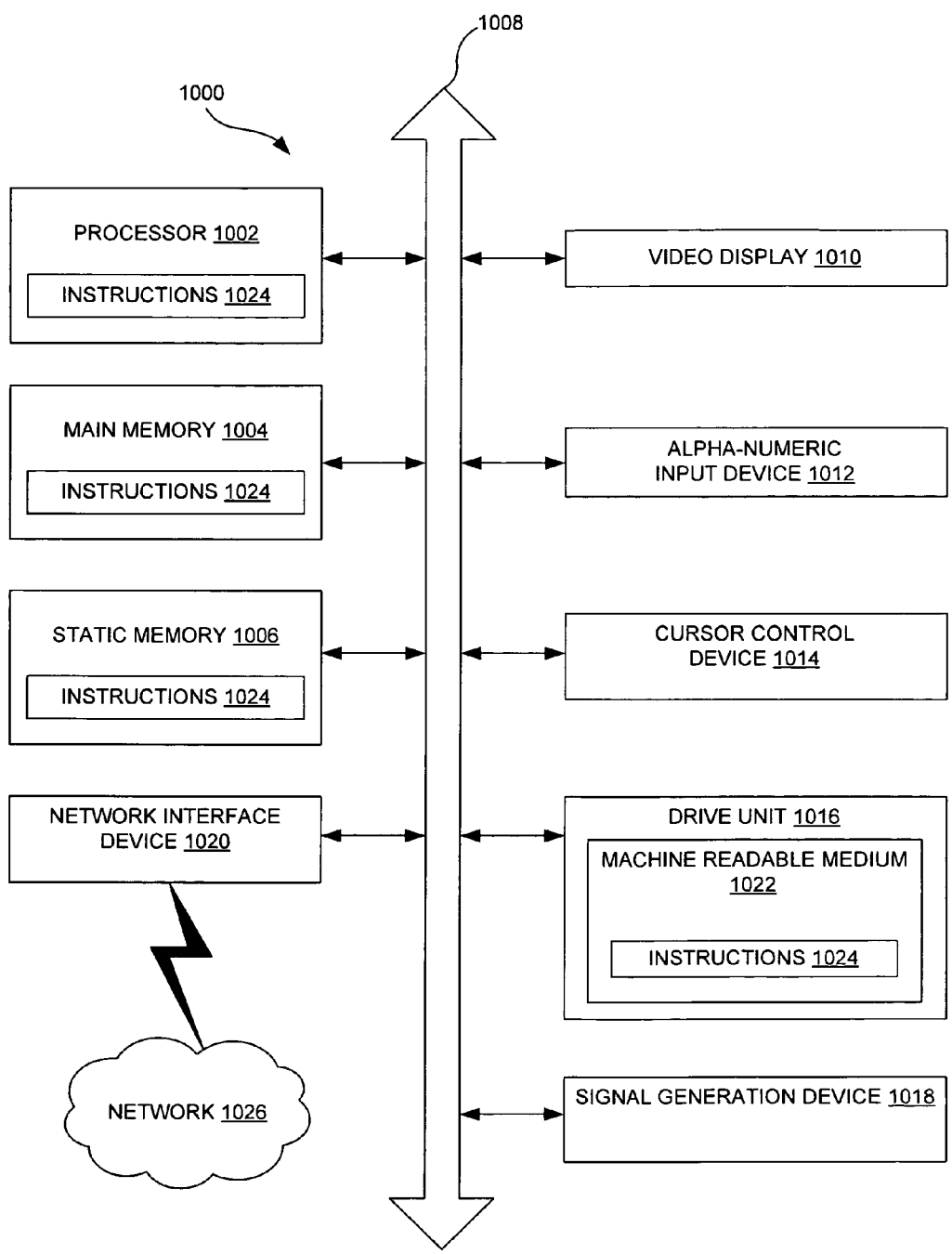
FIG. 10 is a diagrammatic system view of a data processing system in which any of the embodiments disclosed herein may be performed, according to one embodiment.

FIG. 10 is a diagrammatic system view 1000 of a data processing system in which any of the embodiments disclosed herein may be performed, according to one embodiment. Particularly, the system view 1000 of FIG. 10 illustrates a processor 1002, a main memory 1004, a static memory 1006, a bus 1008, a video display 1010, an alpha-numeric input device 1012, a cursor control device 1014, a drive unit 1016, a signal generation device 1018, a network interface device 1020, a machine readable medium 1022, instructions 1024, and a network 1026, according to one embodiment.

The diagrammatic system view 1000 may indicate a personal computer and/or a data processing system in which one or more operations disclosed herein are performed. The processor 1002 may be microprocessor, a state machine, an application specific integrated circuit, a field programmable gate array, etc. (e.g., Intel® Pentium® processor). The main memory 1004 may be a dynamic random access memory and/or a primary memory of a computer system.

The static memory 1006 may be a hard drive, a flash drive, and/or other memory information associated with the data processing system. The bus 1008 may be an interconnection between various circuits and/or structures of the data processing system. The video display 1010 may provide graphical representation of information on the data processing system. The alpha-numeric input device 1012 may be a keypad, keyboard and/or any other input device of text (e.g., a special device to aid the physically handicapped).

The cursor control device 1014 may be a pointing device such as a mouse. The drive unit 1016 may be a hard drive, a storage system, and/or other long term storage subsystem. The signal generation device 1018 may be a bios and/or a functional operating system of the data processing system. The network interface device 1020 may be a device that performs interface functions, such as code conversion, protocol conversion, and/or buffering, required for communication to and from a network. The machine readable medium 1022 may provide instructions on which any of the methods disclosed herein may be performed. The instructions 1024 may provide source code and/or data code to the processor 1002 to enable any one/or more operations disclosed herein.

Figure 11:
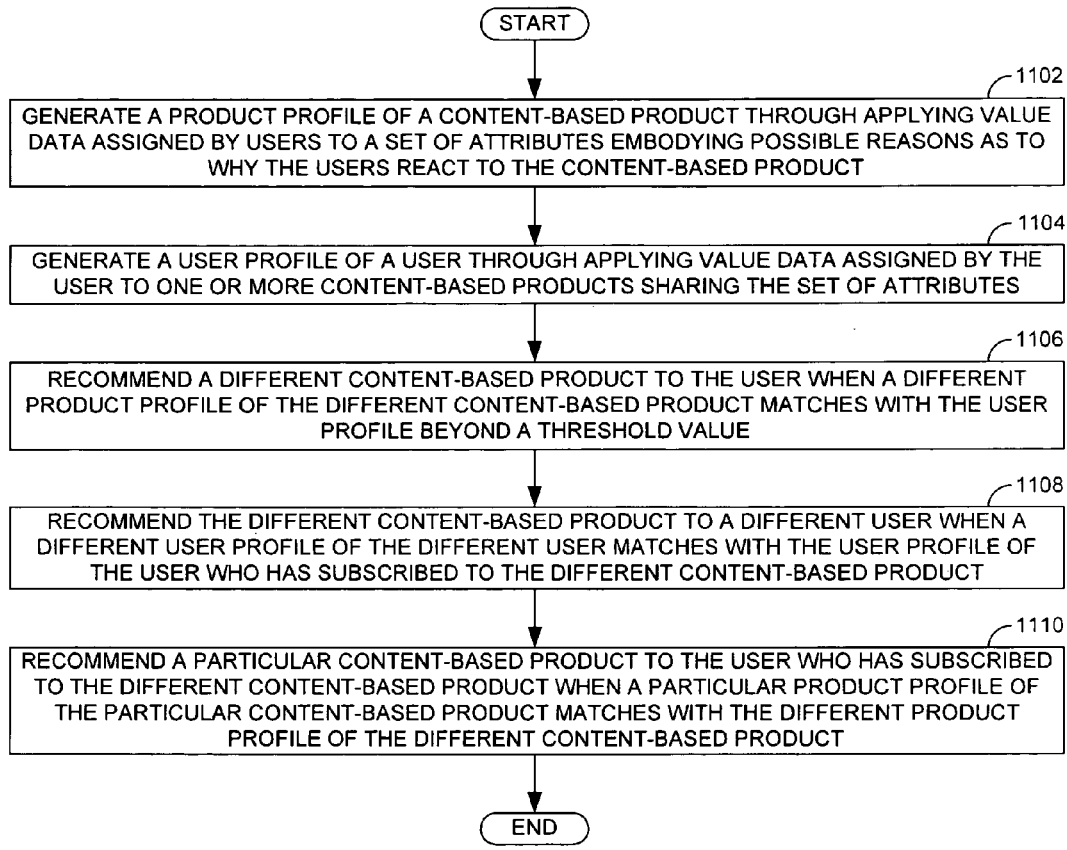
FIG. 11 is a process flow of recommending content-based products based on user profiles and product profiles, according to one embodiment.

FIG. 11 is a process flow of recommending content-based products based on user profiles and product profiles, according to one embodiment. In operation 1102, a product profile (e.g., a product profile 130 of FIG. 1) of a content-based product may be generated through applying value data assigned by users (e.g., the users 110) to a set of attributes embodying possible reasons as to why the users may react to the content-based product. In operation 1104, a user profile (a user profile 128) of a user may be generated through applying value data assigned by the user to one or more content-based products sharing the set of attributes.

In operation 1106, a different content-based product may be recommended to the user when a different product profile of the different content-based product matches with the user profile (e.g., the user profile 128) beyond a threshold value. In operation 1108, the different content-based product may be recommended (e.g., using the recommendation module 102) to a different user when a different user profile of the different user matches with the user profile (e.g., the user profile 128) of the user who has subscribed to the different content-based product. In operation 1110, a particular content-based product may be recommended to the user who has subscribed to the different content-based product when a particular product profile of the particular content-based product matches with the different product profile of the different content-based product.

Figure 12:
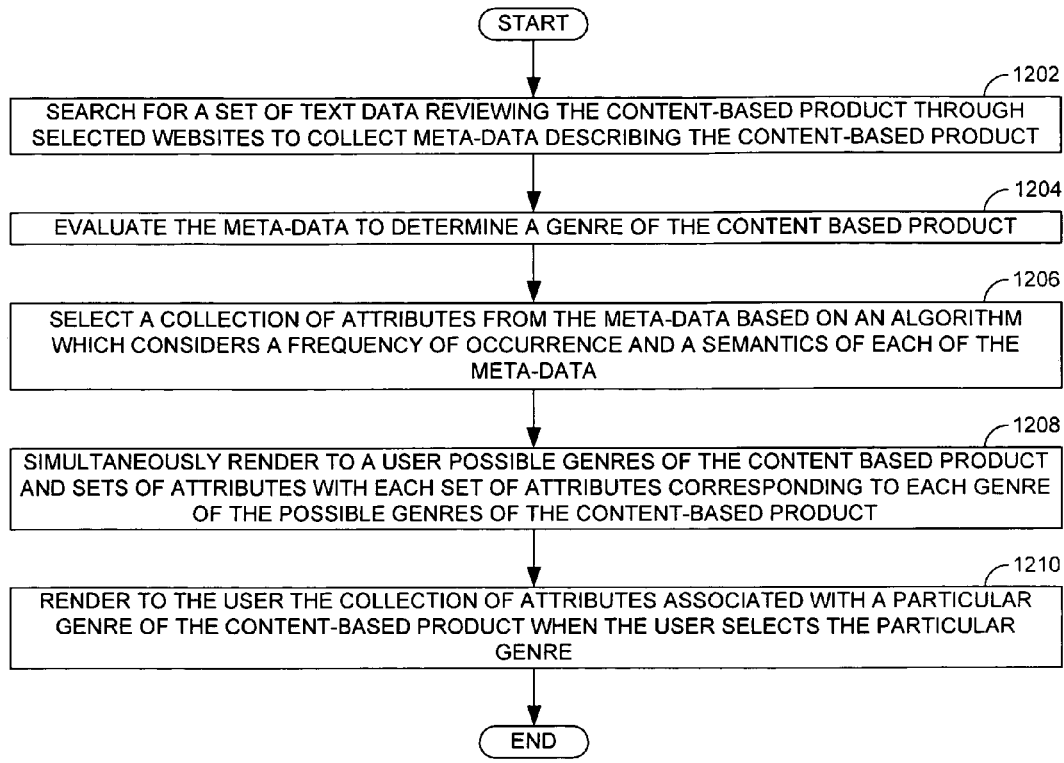
FIG. 12 is a process flow of searching and/or rendering attributes, according to one embodiment.

FIG. 12 is a process flow of searching and/or rendering attributes, according to one embodiment. In operation 1202, a set of text data reviewing the content-based product may be searched for through selected websites to collect meta-data describing the content-based product. In operation 1204, the meta-data may be evaluated to determine a genre (e.g., a genre 304 of FIG. 3) of the content based product.

In operation 1206, a collection of attributes may be selected from the meta-data based on an algorithm that considers a frequency of occurrence and semantics of each of the meta-data. In operation 1208, possible genres of the content based product and sets of attributes may be simultaneously rendered to a user with each set of attributes corresponding to each genre of the possible genres of the content-based product. In operation 1210, the collection of attributes associated with a particular genre of the content-based product may be rendered to the user when the user selects the particular genre.

Figure 13:
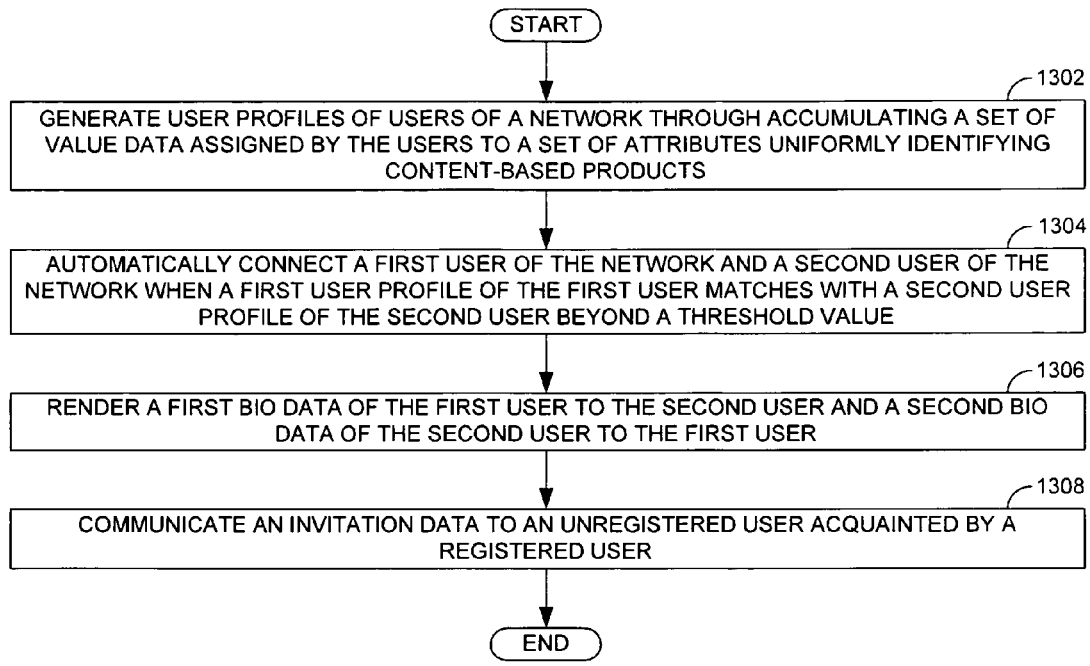
FIG. 13 is a process flow to create a network of registered users of a content provider module of FIG. 9, according to one embodiment.

FIG. 13 is a process flow to create a network of registered users of a content provider module 900 of FIG. 9, according to one embodiment. In operation 1302, user profiles (e.g., the user profile 128 of FIG. 1) of users of a network (e.g., the network of registered users of a content provider module 900) may be generated through accumulating a set of value data assigned by the users to a set of attributes uniformly identifying content-based products.

In operation 1304, a first user of the network and a second user of the network may be automatically connected when a first user profile of the first user matches with a second user profile of the second user beyond a threshold value. In operation 1306, a first bio data (e.g., the bio data 132) of the first user may be rendered to the second user and a second bio data of the second user to the first user. In operation 1308, an invitation data may be communicated to an unregistered user acquainted by a registered user.

Also, the method may be in a form of a machine-readable medium embodying a set of instructions that, when executed by a machine, cause the machine to perform any method disclosed herein. It will be appreciated that the various embodiments discussed herein may/may not be the same embodiment, and may be grouped into various other embodiments not explicitly disclosed herein. For example, the various devices, modules, engines, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the recommendation module 102, the content provider module 106, the attribute profile module 112, the user profile module 114, the product profile module 116, the match module 118, and/or the attribute select module 120 of FIG. 1 may be enabled using transistors, logic gates, and electrical circuits (e.g., application specific integrated ASIC circuitry) using a recommendation circuit, a content provider circuit, an attribute profile circuit, a user profile circuit, a product profile circuit, a match circuit, and/or an attribute select circuit.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
    collecting a plurality of value data for storage in memory, the plurality of value data assigned by at least one user to a set of attributes embodying possible reasons as to why the at least one user reacts to the content-based product, wherein the value data is selected from the group comprising an indication of liking the content-based product, an indication of no opinion on the content-based product, and an indication of disliking the content-based product; and
    executing instructions stored in memory, wherein execution of the instructions by a processor:
        generates a product profile of a content-based product through applying the collected plurality of value data;
        generates a user profile of the at least one user through applying a group of value data assigned by the at least one user to at least one content-based product sharing the set of attributes; and
        generates a recommendation for a different content-based product to the user when a different product profile of the different content-based product corresponds with the user profile beyond a threshold value.

2. The method of claim 1, further comprising generating a score for the content-based product, wherein the indication of liking the content-based product results in adding to the score, the indication of no opinion on the content-based product results in the score remaining the same, and the indication of disliking the content-based product results in subtracting from the score.

3. The method of claim 2, further comprising recommending the different content-based product to a different user when a different user profile of the different user corresponds with the user profile of the user who has subscribed to the different content-based product.

4. The method of claim 2, further comprising recommending a particular content-based product to the user who has subscribed to the different content-based product when a particular product profile of the particular content-based product corresponds with the different product profile of the different content-based product.

5. The method of claim 2, further comprising simultaneously rendering to the at least one user at least one possible genre of the content-based product and at least one set of attributes with each set of attributes corresponding to each genre of the at least one possible genre of the content-based product.

6. The method of claim 5, further comprising applying a bio data of the user to perform the recommending the different content-based product so as to increase an accuracy of the recommending.

7. The method of claim 6, further comprising determining the set of attributes to display to the at least one user based on a plurality of tag data assigned by a group of opinion leaders evaluating the content-based product prior to the display.

8. The method of claim 7, further comprising generating a discrete user profile associated with each genre of the at least one content-based product, wherein the each genre is determined by at least one of a distinctive style, a form, and a content of the at least one content-based product.

9. The method of claim 8, further comprising:
    searching for a set of text data reviewing the content-based product through a plurality of selected websites to collect a plurality of meta-data describing the content-based product; and
    evaluating the plurality of meta-data to determine a genre of the content based product.

10. The method of claim 9, further comprising selecting a collection of attributes from the plurality of meta-data based on an algorithm which considers at least a frequency of occurrence and a semantics of each of the plurality of meta-data.

11. The method of claim 10, further comprising rendering to the at least one user the collection of attributes associated with the genre of the content-based product when the at least one user selects the genre.

12. The method of claim 1, further comprising communicating an invitation data to an unregistered user acquainted by a registered user.

13. A machine-readable storage medium embodying a set of instructions that, when executed by a machine, causes the machine to perform a method comprising:
    collecting a plurality of value data for storage in memory, the plurality of value data assigned by at least one user to a set of attributes embodying possible reasons as to why the at least one user reacts to the content-based product, wherein the value data is selected from the group comprising an indication of liking the content-based product, an indication of no opinion on the content-based product, and an indication of disliking the content-based product;
    generating a product profile of a content-based product through applying the collected plurality of value data;
    generating a user profile of the at least one user through applying a group of value data assigned by the at least one user to at least one content-based product sharing the set of attributes; and
    generating a recommendation for a different content-based product to the user when a different product profile of the different content-based product corresponds with the user profile beyond a threshold value.

14. A system, comprising:
    a content provide module stored in memory and executable by a processor to collect a plurality of value data assigned by at least one user to a set of attributes embodying possible reasons as to why the at least one user react to at least one content-based product, wherein the value data is selected from the group comprising an indication of liking the content-based product, an indication of no opinion on the content-based product, and an indication of disliking the content-based product;
    an attribute profile module stored in memory and executable by the processor to generate:
        a product profile of a content-based product through applying the collected plurality of value data, and
        a user profile of the at least one user through applying a group of value data assigned by the at least one user to at least one content-based product sharing the set of attributes; and a recommendation module stored in memory and executable by the processor to recommend the at least one content-based product to a particular user when a product profile of the at least one content-based product corresponds with a user profile of the particular user beyond a threshold value.

15. The method system of claim 14, further comprising an attribute select module stored in memory and executable by the processor to fetch and displaying the set of attributes corresponding to the at least one content-based product.

16. The system of claim 15, further comprising a match module stored in memory and executable by the processor to connect the particular user to the at least one content-based product when the user profile of the particular corresponds with the product profile of the at least one-content based product beyond a threshold value.

* * * * *